United States Patent
Kumar et al.

(10) Patent No.: US 10,452,782 B1
(45) Date of Patent: Oct. 22, 2019

(54) SYSTEMS AND METHODS FOR DISTRIBUTING INTENT MODELS

(71) Applicant: Facebook, Inc., Menlo Park, CA (US)

(72) Inventors: Anuj Kumar, Santa Clara, CA (US); Benoit F. Dumoulin, Palo Alto, CA (US)

(73) Assignee: Facebook, Inc., Menlo Park, CA (US)

(*) Notice: Subject to any disclaimer, the term of this patent is extended or adjusted under 35 U.S.C. 154(b) by 0 days.

(21) Appl. No.: 15/900,703

(22) Filed: Feb. 20, 2018

(51) Int. Cl.
  *G06F 17/27* (2006.01)
  *G06Q 30/06* (2012.01)
  *G06N 20/00* (2019.01)

(52) U.S. Cl.
  CPC ........ *G06F 17/2785* (2013.01); *G06F 17/278* (2013.01); *G06N 20/00* (2019.01); *G06Q 30/0601* (2013.01)

(58) Field of Classification Search
  USPC .... 704/2, 7, 8, 9, E15.014, 250, 255, 256.1, 704/256.4, 256.5, 256.6, 259, 266, 263, 704/E15.046, E15.047; 706/12, 13; 709/217, 218, 219, 229, 244; 705/26.35
  See application file for complete search history.

(56) References Cited

U.S. PATENT DOCUMENTS

| | | | |
|---|---|---|---|
| 2002/0133545 A1* | 9/2002 | Fano | G06Q 10/10 709/203 |
| 2014/0164476 A1* | 6/2014 | Thomson | G06Q 10/101 709/203 |
| 2014/0279078 A1* | 9/2014 | Nukala | G06Q 30/0243 705/14.73 |
| 2018/0260735 A1* | 9/2018 | Arad | G06N 5/04 |

* cited by examiner

*Primary Examiner* — Leshui Zhang
(74) *Attorney, Agent, or Firm* — Sheppard Mullin Richter & Hampton LLP

(57) ABSTRACT

Systems, methods, and non-transitory computer-readable media can receive, from a first entity, training data for training an intent model associated with a first intent of a plurality of intents. A first intent model associated with the first intent is generated based on the training data. The first intent model is made available in an intent marketplace for access by a second entity.

11 Claims, 7 Drawing Sheets

500

```
┌─────────────────────────────────────────────────────────────────────────┐
│ Receive an indication that a first entity has purchased access to a     │
│ first intent model through an intent marketplace, the first intent      │
│ model associated with a first intent                                     │
│                               502                                        │
└─────────────────────────────────────────────────────────────────────────┘
                                    │
                                    ▼
┌─────────────────────────────────────────────────────────────────────────┐
│         Receive a natural language user request directed to the          │
│                              first entity                                │
│                                 504                                      │
└─────────────────────────────────────────────────────────────────────────┘
                                    │
                                    ▼
┌─────────────────────────────────────────────────────────────────────────┐
│    Determine that the natural language user request is associated        │
│                         with the first intent                            │
│                                 506                                      │
└─────────────────────────────────────────────────────────────────────────┘
                                    │
                                    ▼
┌─────────────────────────────────────────────────────────────────────────┐
│   Process the natural language user request based on the first intent    │
│   model based on a determination that the first entity has purchased     │
│                     access to the first intent model                     │
│                                 508                                      │
└─────────────────────────────────────────────────────────────────────────┘
```

SYSTEMS AND METHODS FOR DISTRIBUTING INTENT MODELS

FIELD OF THE INVENTION

The present technology relates to the field of automated natural language and machine learning processing. More particularly, the present technology relates to techniques for generating and distributing intent models.

BACKGROUND

Today, people often utilize computing devices (or systems) for a wide variety of purposes. Users can use their computing devices, for example, to interact with one another, create content, share content, and view content. In some cases, a user can utilize his or her computing device to access various services, such as a search service or a social networking system (or service). When utilizing a computing device, a user will generally interact with one or more computing devices or systems, and various interfaces associated therewith. In order to make such interactions more intuitive, users can be provided with the ability to interact using "natural language" requests. For example, rather than a user having to type in a search request for "weather Alameda, Calif.," the user can type in the natural language request "What is the weather in Alameda today?" Automated natural language processing techniques can be used to analyze and determine an appropriate response to a user's natural language request.

SUMMARY

Various embodiments of the present disclosure can include systems, methods, and non-transitory computer readable media configured to receive, from a first entity, training data for training an intent model associated with a first intent of a plurality of intents. A first intent model associated with the first intent is generated based on the training data. The first intent model is made available in an intent marketplace for access by a second entity.

In an embodiment, an indication that the second entity has purchased access to the first intent model is received.

In an embodiment, a natural language user request directed to the second entity is received. It is determined that the natural language user request is associated with the first intent. The natural language user request is processed based on the first intent model.

In an embodiment, the processing the natural language user request based on the first intent model is performed based on a determination that the second entity has purchased access to the first intent model.

In an embodiment, the training data comprises a set of private training data, and a set of public training data.

In an embodiment, the first intent model is a public intent model generated based on the set of public training data, and without utilizing the set of private training data.

In an embodiment, a second intent model associated with the first intent is generated based on the set of private training data and the set of public training data.

In an embodiment, the first intent model is made available in the intent marketplace, and the second intent model is not made available in the intent marketplace.

In an embodiment, the first intent model is tested based on a set of testing data. Results of the testing are published in the intent marketplace.

In an embodiment, the set of testing data comprises a plurality of natural language user requests, and the testing the first intent model comprises processing the plurality of natural language user requests based on the first intent model.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 5 illustrates an example method associated with utilizing intent models for natural language processing, according to an embodiment of the present disclosure.

Figure 1:
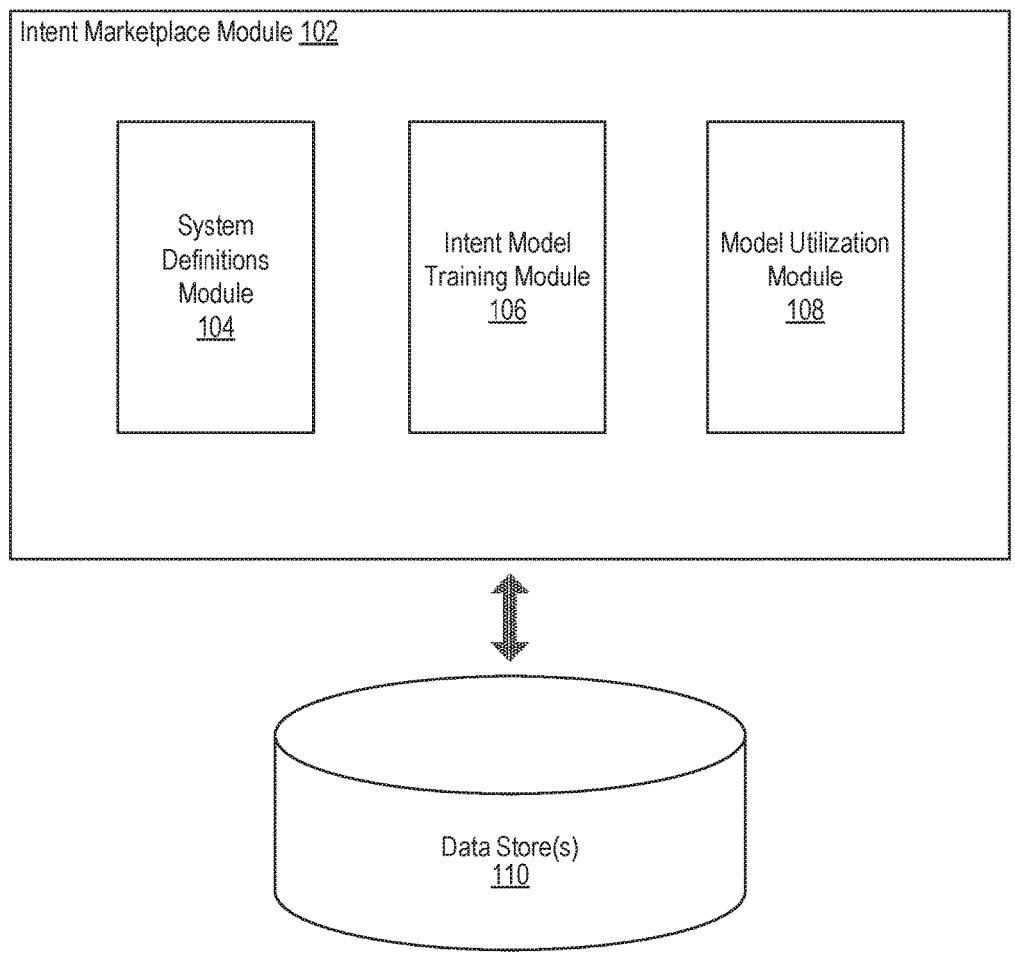
FIG. 1 illustrates an example system including an intent marketplace module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Generation and Distribution of Machine Learning Intent Models for Automated Natural Language Processing As mentioned, people often utilize computing devices (or systems) for a wide variety of purposes. Users can use their computing devices, for example, to interact with one another, create content, share content, and view content. In some cases, a user can utilize his or her computing device to access various services, such as a search service or a social networking system (or service). When utilizing a computing device, a user will generally interact with one or more computing devices or systems, and various interfaces associated therewith. In order to make such interactions more intuitive, users can be provided with the ability to interact using "natural language" requests. For example, rather than a user having to type in a search request for "weather Alameda, Calif.," the user can type in the natural language request "What is the weather in Alameda today?" Automated natural language processing techniques can be used to analyze and determine an appropriate response to a user's natural language request.

Conventional approaches specifically arising in the realm of computer technology include machine learning models that are trained to analyze user natural language requests. Within the technical field of automated natural language processing, there exist the concepts of "intents" and "slots." Intents are typically high-level use cases associated with various types of user requests, and slots are typically attributes or input parameters used to determine a response to a user request. One or more slots can be associated with an intent, such that the one or more slots associated with an intent may be useful for addressing a user's natural language request associated with the use case for the intent. For example, an example of an intent might include a WEATHER_FIND intent that is used to process user natural language requests directed to finding out the weather in a particular location at a particular time, and the slots associated with the WEATHER_FIND intent can include location information (e.g., a city name) and date/time information (e.g., today). Entities implementing automated natural language processing will generally train one or more machine learning models, sometimes referred to as intent models, to process a user natural language request by identifying an appropriate intent associated with the request, and identifying slot information (i.e., slots) included within the user request. For example, if a user submits the natural language request "What is the weather in Menlo Park going to be like tomorrow?", one or more machine learning models can be trained to determine that this request is associated with the WEATHER_FIND intent, and to determine that the slot information contained in the request includes location information (Menlo Park) and date/time information (tomorrow).

Such conventional approaches are problematic for various reasons. For example, under conventional approaches, entities seeking to implement automated natural language processing must typically hire numerous in-house engineers to train intent models for each intent the entity plans to implement. These approaches are generally not scalable, and require the hiring of more engineers to train and implement more intent models. This can be particularly problematic for smaller or less sophisticated companies that may not have the technical know-how to properly train and implement machine learning intent models. The inability for conventional approaches to scale efficiently hinders the implementation of machine learned automated natural language processes. Furthermore, existing approaches represent an inefficient utilization of computing resources, as multiple entities must repeat the work of defining their own intents, slots, and intent models. These disparate, often incompatible intent models must then be stored and accessed individually, further exacerbating the waste of computing resources.

An improved approach rooted in computer technology overcomes the foregoing and other disadvantages associated with conventional approaches specifically arising in the realm of computer technology. In general, a set of intents and a set of slots can be defined. A set of domains can also be defined, with each domain comprising one or more intents. In various embodiments, the sets of domains, intents, and/or slots can be defined by any entity implementing an automated natural language processing system, and can include, for example, a platform entity (or platform provider) providing intent models, a social networking system, or an entity that is implementing an automated assistant application. However, rather than having a single entity provide training data and training machine learning models for each and every intent that is defined, the present disclosure contemplates provision of an infrastructure for third parties to train intent models. In other words, once a set of intents and a set of slots have been defined, training data can be received from one or more third parties to train intent models for various intents in the set of intents. A third party can maintain at least some degree of control or ownership over an intent model that has been trained based on the third party's training data. The third party can be provided with a platform on which to distribute its trained intent model. For example, a platform provider, such as a social networking system, can define a set of domains, a set of intents, and a set of slots. The set of domains can include, for example, a "Weather" domain, the set of intents can include one or more intents directed to weather-related user requests, and the set of slots can include one or more slots useful for processing weather-related user requests. However, the social networking system may not be ideally equipped to provide training data for training and implementing weather-related intent models. As such, rather than training its own weather-related intent models, the social networking system can provide an infrastructure for other, better-suited third parties to train weather-related intent models. For example, a provider of a weather application, Weather Company A, can provide training data to train one or more weather-related intent models. Weather Company A can also be provided with the option to distribute its trained weather-related intent models to other parties, such as other weather application providers. In this way, entities that are better suited to implement intent models can train and implement such models, and distribute them (e.g., sell and/or lease them) to other entities that may not have the technical know-how or resources to train intent models. Entities that are not equipped to develop their own intent models can purchase and/or otherwise acquire intent models from other entities. Entities or users, as discussed herein, can include different businesses, companies, organizations, individual users, and the like. More details relating to the disclosed technology are provided below.

FIG. 1 illustrates an example system 100 including an intent marketplace module 102, according to an embodiment of the present disclosure. The intent marketplace module 102 can be configured to manage a set of intents and a set of slots. In an embodiment, the intent marketplace module 102 can also be configured to manage a pre-defined set of domains. The intent marketplace module 102 can receive from a first entity training data for training a first intent model. In certain embodiments, an intent model can be associated with one intent of the set of intents. In other embodiments, an intent model can be associated with multiple intents. In certain embodiments, an intent model can be associated with one or more domains of a set of domains, with each domain comprising a plurality of intents. The intent marketplace module 102 can generate the first intent model based on the training data. The intent marketplace module 102 can make the first intent model available within a model marketplace. The intent marketplace module 102 can receive a request from a second entity to acquire access to the first intent model. For example, the request may take the form of a licensing or purchase transaction. The intent marketplace module 102 can provide the second entity with access to the first intent model based on the request.

In various embodiments, the intent marketplace module 102 can also receive as an input a natural language user request. The intent marketplace module 102 can determine an intent of the set of intents that is associated with the user request. The intent may be associated with one or more intent models associated with one or more entities (e.g., generated based on training data provided by the one or more entities). The intent marketplace module 102 can identify an intent model associated with the intent. The intent marketplace module 102 can generate a response to the user request based on the intent model.

As shown in the example of FIG. 1, the intent marketplace module 102 can include a system definitions module 104, an intent model training module 106, and a model utilization module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the intent marketplace module 102 can be implemented in any suitable combinations.

In some embodiments, the intent marketplace module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the intent marketplace module 102 can be, in part or in whole, implemented as software running on one or more computing devices or systems, such as on a server system or a client computing device. In some instances, the intent marketplace module 102 can be, in part or in whole, implemented within or configured to operate in conjunction with or be integrated with a social networking system (or service), such as a social networking system 630 of FIG. 6. Likewise, in some instances, the intent marketplace module 102 can be, in part or in whole, implemented within or configured to operate in conjunction with or be integrated with a client computing device, such as the user device 610 of FIG. 6. For example, the intent marketplace module 102 can be implemented as or within a dedicated application (e.g., app), a program, or an applet running on a user computing device or client computing system. The application incorporating or implementing instructions for performing functionality of the intent marketplace module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The intent marketplace module 102 can be configured to communicate and/or operate with the at least one data store 110, as shown in the example system 100. The data store 110 can be configured to store and maintain various types of data. In some implementations, the data store 110 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 110 can store information that is utilized by the intent marketplace module 102. For example, the data store 110 can store a set of domains, a set of intents, a set of slots, hierarchical data defining relationships between domains, intents, and slots, training data for one or more intent models, one or more trained intent models, access rights information for the one or more trained intent models, and the like. It is contemplated that there can be many variations or other possibilities.

The system definitions module 104 can be configured to manage a set of systems definition information. As mentioned above, a platform entity, such as a social networking system, can provide a model generation platform on which one or more intent models can be trained and implemented, and also distributed in a model marketplace. The systems definition information can include a set of intents and a set of slots that have been defined in whole or in part by the platform entity. In an embodiment, the systems definition information can also include a set of domains, and each domain can comprise or be associated with one or more intents. For example, the systems definition information can define a set of domains, and the set of domains can include a first domain directed to "weather" and a second domain directed to "cooking." The first domain, directed to weather, can include a first intent, "WEATHER_FIND," which is directed to determining the weather for a particular location at a particular time or within a particular time interval. For example, the WEATHER_FIND intent can be used to respond to a user request "What will the weather be like tomorrow in Los Angeles?" The first domain, directed to weather, can also include a second intent, "WEATHER_IS-TRUE," which is directed to determining a binary attribute about the weather. For example, the WEATHER_ISTRUE intent can be used to respond to a user request "Will it rain in New York tomorrow?" The WEATHER_FIND intent can be associated with the slots "location" and "date/time," while the WEATHER_ISTRUE intent can be associated with the slots "weather attribute," "location," and "date/time." Similarly, the second domain, directed to "cooking," can include its own set of intents. For example, the second domain can include a "FIND_RECIPE" intent for finding a recipe, and the intent can be associated with the slot "recipe_name," to respond to user requests such as "Find me a recipe for chicken marsala."

As discussed above, a domain can comprise one or more intents, and each intent can be associated with one or more slots. In various embodiments, slots may also be associated with one or more domains. In certain embodiments, certain slots may be "system slots" which can be utilized in any domain or intent. For example, the slots directed to date/time and location could be useful in any domain or intent. As such, these slots may be generally available for use with any domain or intent.

In an embodiment, the set of systems definition information can be defined and/or determined solely by a platform entity, such that the set of systems definition information cannot be modified by any third party without permission of the platform entity. This may be done in order to avoid unnecessary duplication of domains, intents, and/or slots by third parties. In certain embodiments, the system definitions module 104 can be configured to receive requests from third parties requesting the addition of new domains, intents, and/or slots that do not currently exist. The platform entity can review such requests, and make modifications to the systems definition information if deemed desirable or necessary.

The intent model training module 106 can be configured to train intent models, such as machine learning models, based on training data. The intent model training module 106 can receive a set of training data, and generate an intent model based on the set of training data. In certain instances, the intent model training module 106 can receive training data from a platform entity (e.g., an entity that has defined a set of systems definition information and has provided a model generation platform on which one or more intent models can be trained and implemented). However, as mentioned above, the number of intents defined by the platform entity may be very large such that it may be impractical or undesirable for the platform entity to train intent models to cover every intent. As such, the platform entity may choose to train intent models for a subset of the set of intents. The intent model training module 106 can also receive training data from one or more third parties to train intent models. For example, a first entity that has expertise in weather-related applications can provide training data to train intent models for weather-related intents, while a second entity that has expertise in cooking-related applications can provide training data to train intent models for cooking-related intents. As another example, a plurality of entities can collaborate by combining their training data and cooperatively training an intent model on the model generation platform.

In an embodiment, training data for training an intent model can comprise a plurality of training instances, with each training instance comprising a sequence of words (e.g., a natural language sentence). Each training instance can also comprise a sequence of slot outputs (or values) indicating which words in the sequence of words are directed to which slots. Each training instance can also comprise an intent output (or value) indicating the intent to which the training instance is directed. For example, a single training instance may include the sentence "What is the weather today in San Francisco?" The training instance can include the intent output "WEATHER_FIND" to indicate that this training instance is directed to the WEATHER_FIND intent. The training instance can also include a set of slot outputs indicating that the word "today" is directed to the slot "date/time," and the words "San Francisco" are directed to the slot "location," while all other words in the training instance are not directed to any slot. A second training instance can include the sentence "Tell me the current weather in Los Angeles." This second training instance can have the same intent output, and slot outputs indicating that the word "current" is directed to the slot "date/time" and the words "Los Angeles" are directed to the slot "location." By providing a large number of training instances, the intent model can be trained to receive a natural language user request as an input, determine an intent associated with the user request (or determine whether an associated intent is relevant to the user request), and identify slot information contained within the user request (i.e., which words in the user request are relevant to which slots).

As mentioned above, in various embodiments and various instances, an intent model can be associated with a single intent, a set of intents, a domain, and/or a set of domains. For example, an intent model can be directed to the WEATHER_FIND intent, or to all intents contained within the weather domain, or to a subset of intents contained within the weather domain. In certain embodiments, training data provided to the intent model training module 106 can be for training a new intent model, or for improving an existing intent model. For example, if an existing intent model for an intent is able to identify slot information for two different slots (e.g., location, date/time), additional training data can be provided so that the intent model can identify information relating to a third slot.

In certain embodiments, an entity can designate a subset of training data as private training data, and a subset of training data as public training data. In this way, an entity can submit a single set of training data, but the intent model training module 106 can train two separate models based on the set of training data: a private intent model based on the private training data and optionally the public data, that is accessible only to the entity that provided the private training data, and a public intent model based on the public training data, that may be accessible to other, additional entities (e.g., other entities that may want to acquire access to the public intent model). This may be useful, for example, if an entity has certain training data that it would like to keep proprietary, or if it has certain training data that is only applicable to the entity, and not to other entities. For example, consider an example scenario in which an automobile rideshare service would like to train an intent model for processing rideshare requests. The rideshare service includes various proprietary levels of service, e.g., LevelVIP, LevelBusiness, LevelPool, etc. It may be useful for the rideshare service's intent model to be able to identify and distinguish between these levels of service (for example, to appropriately distinguish between a first user's request "Book me a LevelVIP to SFO" and a second user's request "Please call me a LevelPool to San Francisco International Airport."). However, distinguishing between these levels of service would not necessarily be useful for a third party that chose to purchase access to and/or otherwise utilize the rideshare intent model. As such, in this example, the rideshare service's training data can include a first subset of training instances which includes references to the rideshare service's proprietary levels of service, and a second subset of training instances which does not include references to the rideshare service's levels of service. The first subset of training instances can be labeled private training data, while the second subset of training instances can be labeled public training data. The model training module 106 can train a public intent model based on the public training data, and a private intent model based on the private training data and optionally the public training data. The private intent model can be made accessible only to the rideshare service (e.g., the private intent model is only used when users submit requests directed to the rideshare service), while the public intent model can be made accessible to third parties (e.g., other ridesharing services can acquire access rights to the public intent model so that it can be used to process ridesharing requests for the other ridesharing services).

The model utilization module 108 can be configured to make one or more intent models available in a model marketplace. Users can use the model marketplace to request and/or gain access to intent models implemented by other users/entities. The model utilization module 108 can also be configured to process natural language user requests based on intent models. The model utilization module 108 is described in greater detail with reference to FIG. 2.

Figure 2:
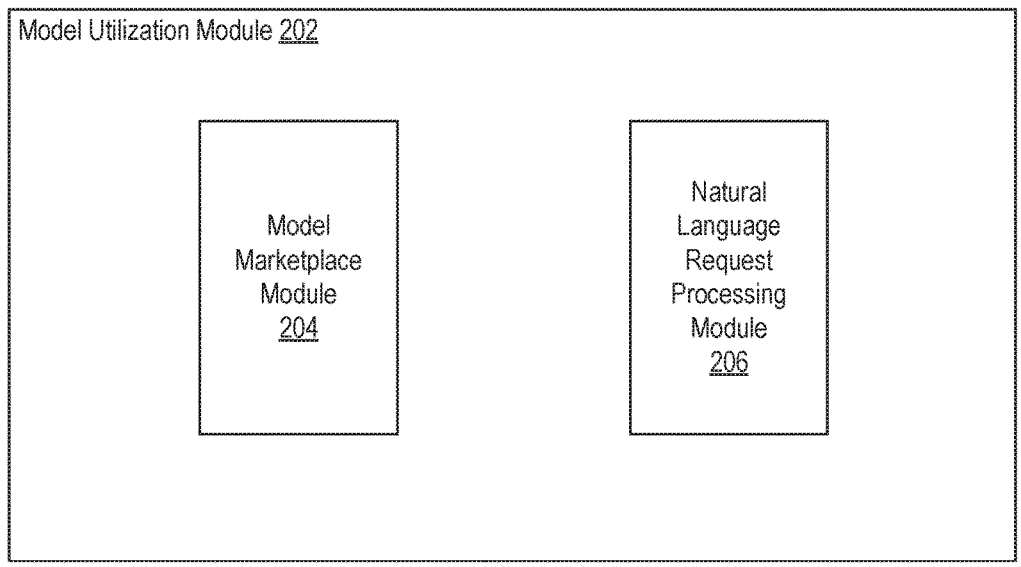
FIG. 2 illustrates an example model utilization module, according to an embodiment of the present disclosure.

FIG. 2 illustrates an example model utilization module 202 configured to utilize one or more intent models, according to an embodiment of the present disclosure. In some embodiments, the model utilization module 108 of FIG. 1 can be implemented as the model utilization module 202. As shown in the example of FIG. 2, the model utilization module 202 can include a model marketplace module 204 and a natural language request processing module 206.

The model marketplace module 204 can be configured to implement a model marketplace within which users can request and/or acquire access to intent models generated on a model generation platform. For example, the model generation platform may be provided by a platform entity, such as a social networking system. As described above, users (e.g., entities) can generate intent models directed to one or more intents defined by the platform by providing a set of training data. Users can opt to make intent models available in the model marketplace. If an intent model is available in the model marketplace, an acquiring user can purchase access to or otherwise secure rights to use the intent model for processing natural language user requests. For example, consider an example scenario in which an entity Weather Provider A has provided training data (e.g., to a social networking system, or other model generation platform) for training one or more weather-related intent models. Weather Provider A, having been responsible for generating the one or more intent models, can use such intent models to process weather-related natural language user requests. For example, a user can send a message to a Weather Provider A bot asking "Is it going to rain today in Washington D.C.?" and the one or more intent models can be used to process the message and generate an appropriate response. Now consider a further scenario in which another weather application, Weather Provider B, also wishes to use the one or more weather-related intent models trained by Weather Provider A. Weather Provider A can make the one or more intent models available in an intent marketplace. Weather Provider B can request access and secure access to the one or more intent models. Once Weather Provider B secures access to the one or more intent models, the model marketplace module 204 can associate Weather Provider B with the one or more intent models such that natural language user requests directed to Weather Provider B can now be processed using the one or more intent models. In various embodiments, an entity securing accessing to use an intent model can do so through an API or otherwise through networked communication with the model generation platform, the intent marketplace, and/or the entity that generated the intent model.

As mentioned above, a platform entity that implements the model marketplace and/or a model generation platform can train its own intent models for at least some intents. In one embodiment, users may be provided with access to the platform entity's intent models, and can purchase access to or otherwise secure access to upgraded or improved intent models provided by other entities.

In certain embodiments, the model marketplace module 204 can implement one or more quality control features for ensuring the quality of intent models available in the model marketplace. For example, the model marketplace module 204 can provide a test set of natural language user requests (or user inputs) to test an accuracy of an intent model. The model marketplace can include a reliability score for each intent model indicating how accurately the intent model was able to process the test set of natural language user inputs.

In another embodiment, developers of intent models (i.e., the entity that provided training data for generating an intent model that is posted to the intent marketplace) can provide test data demonstrating the reliability of their intent model. The test data can be posted to the model marketplace so that potential purchasers of intent models can view the test data to assist in making a determination of which intent model to purchase access to or whether or not to purchase access to a particular intent model. In one embodiment, the model marketplace module 204 can implement a trial period during which a potential purchaser of an intent model can test the intent model to see if it is reliable and whether or not to purchase access to the intent model.

The natural language request processing module 206 can be configured to process a natural language user input based on one or more intent models. In one embodiment, the natural language request processing module 206 can determine an intent model that is relevant to the user input based on words contained in the user input. The natural language request processing module 206 can determine the relevant intent model based on one or more machine learning models. In one embodiment, the natural language request processing module 206 can utilize the identified intent model to identify slot information in the user input. Identifying slot information can comprise using the intent model to determine, for each word in the user input, whether the word is associated with a slot of a set of slots (e.g., the set of slots defined by a platform entity) and, if yes, which slot. A response to the user request can then be generated and provided to the user. For example, if a user submits the user input "Find me a macaroni and cheese recipe," the natural language request processing module 206 can determine that a FIND_RECIPE intent is relevant to the user request, and the words "macaroni and cheese" are associated with and/or relevant to a "recipe name" slot. A search can be run using the slot information, and a response generated for the user wherein the response provides the user with a macaroni and cheese recipe.

In one embodiment, users, through their associated computing devices, can submit natural language user inputs (or natural language user requests) directly to a particular entity in networked communication with the computing devices. For example, if a user would like to obtain a certain type of information, the user, through a computing device associated with the user, can submit a request directly to a bot and/or application provided by an entity that maintains that type of information. The bot or application can include, for example, an application or utility running on a computing device associated with the user or a separate device in networked communication with the computing device associated with the user. In another embodiment, users can submit natural language user inputs to a general assistant application or device. For example, the general assistant application or device can be provided by the same entity that has defined and provided an model generation platform (i.e., the platform entity). In certain instances, the user request can be processed using intent models to which the general assistant application has access. In certain instances, the user request can be forwarded to a relevant entity and/or application for processing. For example, if a user submits a user input "Book me a ride on Rideshare Service A to LAX," the natural language processing module 206 can determine that the user request should be forwarded to the entity Rideshare Service A.

Figure 3:
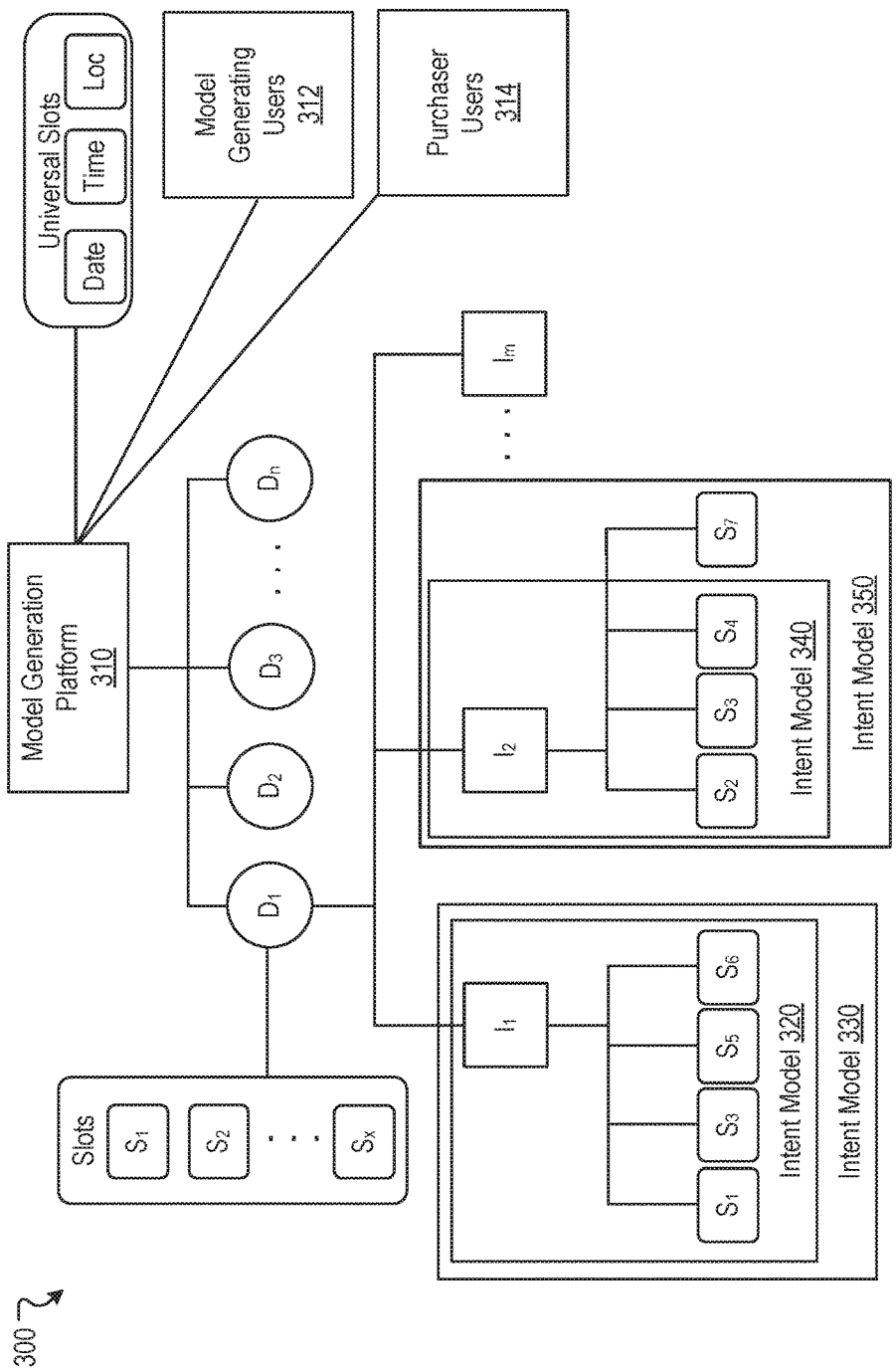
FIG. 3 illustrates an example functional block diagram 300 associated with sharing intent models, according to an embodiment of the present disclosure.

FIG. 3 illustrates an example function block diagram 300 associated with implementing a model generation platform and a model marketplace, according to an embodiment of the present disclosure. The functional block diagram 300 includes a computer system(s) associated with a model generation platform 310 which may, for example, be implemented using the intent marketplace module 102 discussed above. The model generation platform 310 is connected to a computer system(s) associated with one or more model generating users 312 that provide training data for training one or more intent models on the model generation platform 310. The model generation platform 310 is also connected to a computer system(s) associated with one or more purchaser users 314 that may secure access to (e.g., purchase access to) one or more intent models on the model generation platform 310 using, for example, a model marketplace. The model generation platform 310 includes a set of defined domains $D_1$-$D_n$. Each domain comprises one or more intents. For example, a domain $D_1$ is shown to comprise a set of intents $I_1$-$I_m$. The domain $D_1$ is associated with a set of slots $s_1$-$s_x$. Furthermore, each intent in $D_1$ is associated with one or more slots of the set of slots. For example, a first intent $I_1$ is associated with the slots $s_1$, $s_3$, $s_5$, and $s_6$, and a second intent $I_2$ is associated with the slots $s_2$, $s_3$, $s_4$, and $s_7$. The model generation platform 310 is also associated with a set of system slots directed to date, time, and location. The first intent $I_1$ is associated with two intent models 320, 330. This may be the case, for example, because two different entities have provided the model generation platform 310 with their own sets of training data for the intent $I_1$, resulting in two different intent models for that intent. Both intent model 320, 330 can be made available in an intent marketplace for other users to view and users can purchase access to use the intent models 320, 330 in the intent marketplace. The second intent $I_2$ is also associated with two intent models 340, 350. However, the first intent model 340 is only trained to support slots $s_2$, $s_3$, $s_4$, whereas the second intent model 350 is trained to also support additional slot $s_7$. In this case, an entity that submitted training data for training the second intent model 350 may have provided training instances identifying examples of natural language user requests that utilize words associated with the slot $s_7$. Once again, the intent models 340, 350 can be made available in a model marketplace. Users may be able to purchase access to the intent model 340 for a lower price than the intent model 350 due to additional functionality and support for the additional slot 57 in relation to the intent model 350.

Figure 4:
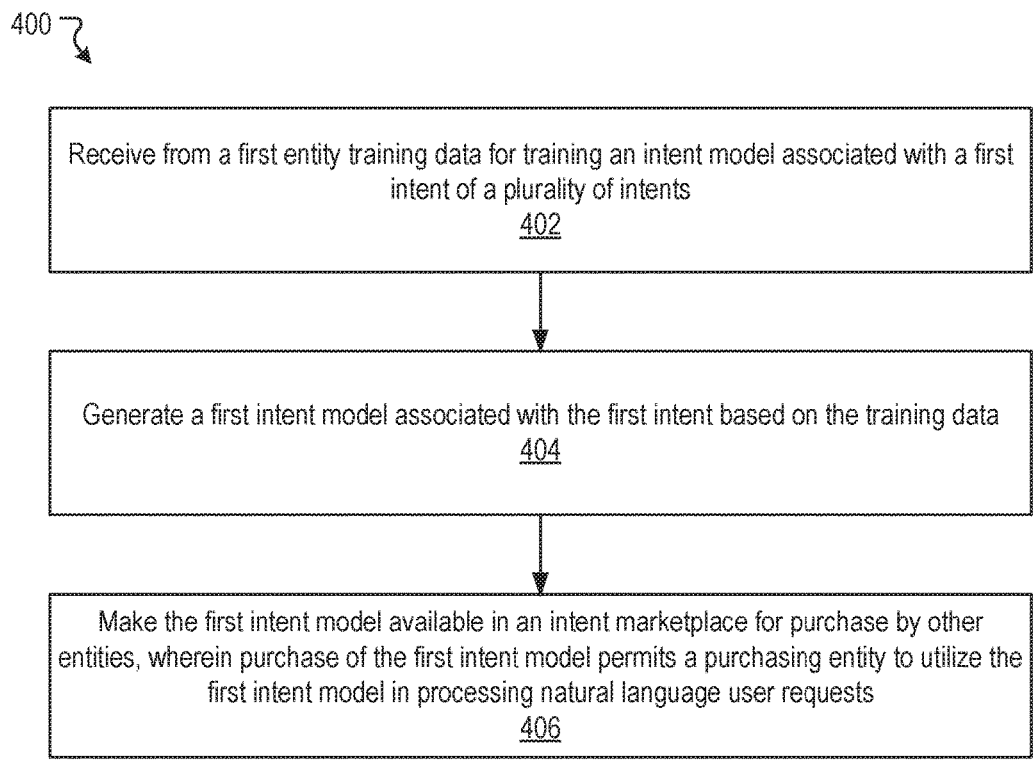
FIG. 4 illustrates an example method associated with distributing intent models, according to an embodiment of the present disclosure.

FIG. 4 illustrates an example method 400 associated with implementing an intent model marketplace, according to an embodiment of the present disclosure. It should be appreciated that there can be additional, fewer, or alternative steps performed in similar or alternative orders, or in parallel, within the scope of the various embodiments discussed herein unless otherwise stated.

At block 402, the example method 400 can receive from a first entity training data for training an intent model associated with a first intent of a plurality of intents. At block 404, the example method 400 can generate a first intent model associated with the first intent based on the training data. At block 406, the example method 400 can make the first intent model available in an intent marketplace for purchase by other entities, wherein purchase of the first intent model permits a purchasing entity to utilize the first intent model in processing natural language user requests.

FIG. 5 illustrates an example method 500 associated with processing a natural language user request, according to an embodiment of the present disclosure. It should be appreciated that there can be additional, fewer, or alternative steps performed in similar or alternative orders, or in parallel, within the scope of the various embodiments discussed herein unless otherwise stated.

At block 502, the example method 500 can receive an indication that a first entity has purchased access to a first intent model through an intent marketplace, the first intent model associated with a first intent. At block 504, the example method 500 can receive a natural language user request directed to the first entity. At block 506, the example method 500 can determine that the natural language user request is associated with the first intent. At block 508, the example method 500 can process the natural language user request based on the first intent model based on a determination that the first entity has purchased access to the first intent model.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
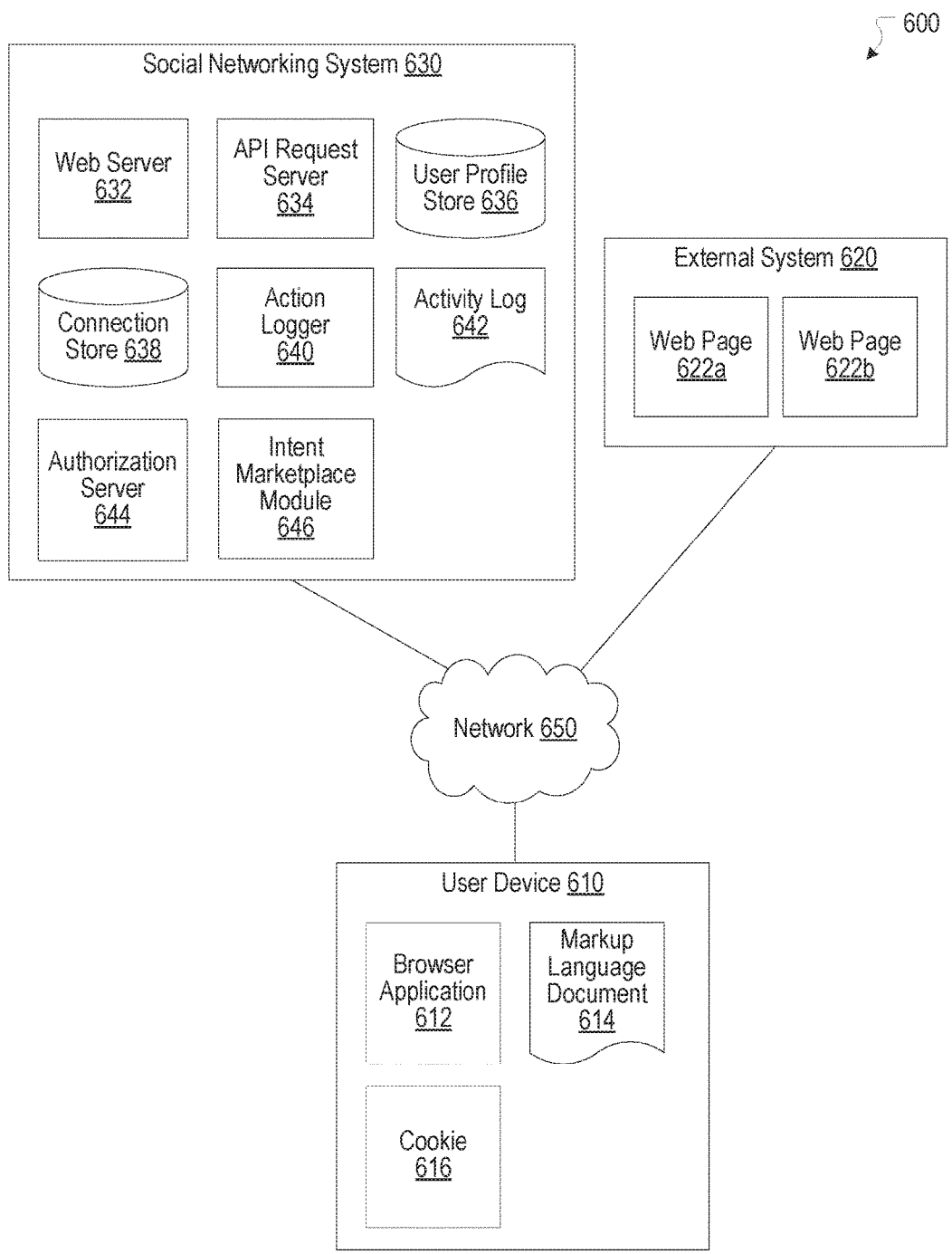
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API)

provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622*a*, 622*b*, which are communicated to the user device 610 using the network 650. The external system 620 is separate from the social networking system 630. For example, the external system 620 is associated with a first domain, while the social networking system 630 is associated with a separate social networking domain. Web pages 622*a*, 622*b*, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include an intent marketplace module 646. The intent marketplace module 646 can, for example, be implemented as the intent marketplace module 102, as discussed in more detail herein. As discussed previously, it should be appreciated that there can be many variations or other possibilities. For example, in some embodiments, one or more functionalities of the intent marketplace module 646 can be implemented in the user device 610. As discussed previously, it should be appreciated that there can be many variations or other possibilities.

Hardware Implementation

Figure 7:
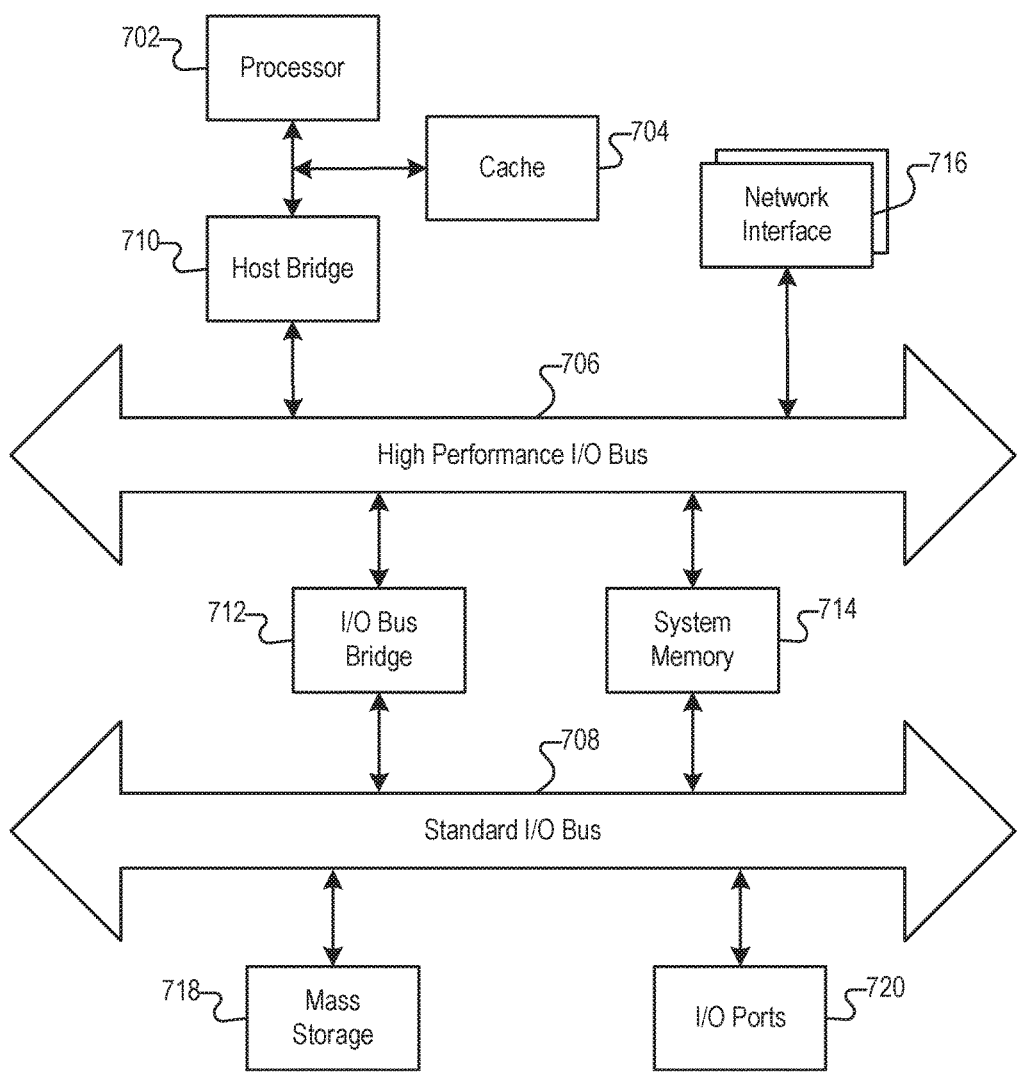
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, by a computing system, from a first entity, training data for training an intent model associated with a first intent of a plurality of intents, wherein the training data comprises a plurality of natural language statements associated with the first intent;
   generating, by the computing system, a first intent model associated with the first intent based on the training data, wherein the first intent model is trained to process natural language requests associated with the first intent;
   making, by the computing system, the first intent model available in an intent marketplace for access by other entities to process natural language requests using the first intent model;
   receiving, by the computing system, an indication that a second entity has purchased access to the first intent model in order to process natural language requests associated with the first intent and directed to the second entity; and
   processing, by the computing system, a natural language request directed to the second entity using the first intent model based on a determination that the second entity has purchased access to the first intent model.

2. The computer-implemented method of claim 1, wherein the training data comprises a set of private training data and a set of public training data.

3. The computer-implemented method of claim 2, wherein the first intent model is a public intent model generated based on the set of public training data without utilizing the set of private training data.

4. The computer-implemented method of claim 3, further comprising generating a second intent model associated with the first intent based at least on the set of private training data.

5. The computer-implemented method of claim 4, wherein the first intent model is made available in the intent marketplace, and the second intent model is not made available in the intent marketplace.

6. The computer-implemented method of claim 1, further comprising:
   testing the first intent model based on a set of testing data; and
   publishing results of the testing the first intent model in the intent marketplace.

7. The computer-implemented method of claim 6, wherein
- the set of testing data comprises a plurality of natural language user requests, and
- the testing the first intent model comprises processing the plurality of natural language user requests based on the first intent model.

8. A system comprising:
- at least one processor; and
- a memory storing instructions that, when executed by the at least one processor, cause the system to perform a method comprising:
- receiving, from a first entity, training data for training an intent model associated with a first intent of a plurality of intents, wherein the training data comprises a plurality of natural language statements associated with the first intent;
- generating a first intent model associated with the first intent based on the training data wherein the first intent model is trained to process natural language requests associated with the first intent;
- making the first intent model available in an intent marketplace for access by other entities to process natural language requests using the first intent model;
- receiving an indication that a second entity has purchased access to the first intent model in order to process natural language requests associated with the first intent and directed to the second entity; and
- processing a natural language request directed to the second entity using the first intent model based on a determination that the second entity has purchased access to the first intent model.

9. The system of claim 8, wherein the training data comprises a set of private training data, and a set of public training data.

10. A non-transitory computer-readable storage medium including instructions that, when executed by at least one processor of a computing system, cause the computing system to perform a method comprising:
- receiving, from a first entity, training data for training an intent model associated with a first intent of a plurality of intents, wherein the training data comprises a plurality of natural language statements associated with the first intent;
- generating a first intent model associated with the first intent based on the training data wherein the first intent model is trained to process natural language requests associated with the first intent;
- making the first intent model available in an intent marketplace for access by other entities to process natural language requests using the first intent model;
- receiving an indication that a second entity has purchased access to the first intent model in order to process natural language requests associated with the first intent and directed to the second entity; and
- processing a natural language request directed to the second entity using the first intent model based on a determination that the second entity has purchased access to the first intent model.

11. The non-transitory computer-readable storage medium of claim 10, wherein the training data comprises a set of private training data, and a set of public training data.

\* \* \* \* \*